(12) United States Patent
Yang et al.

(10) Patent No.: US 11,162,700 B2
(45) Date of Patent: Nov. 2, 2021

(54) METHOD AND APPARATUS FOR IDENTIFYING AIR-CONDITIONING CIRCUIT, AND AIR CONDITIONER

(71) Applicant: QINGDAO HAIER AIR CONDITIONER GENERAL CORP., LTD., Qingdao (CN)

(72) Inventors: Xiaodong Yang, Qingdao (CN); Xiaoli Dong, Qingdao (CN)

(73) Assignee: QINGDAO HAIER AIR CONDITIONER GENERAL CORP., LTD., Qingdao (CN)

( * ) Notice: Subject to any disclaimer, the term of this patent is extended or adjusted under 35 U.S.C. 154(b) by 0 days.

(21) Appl. No.: 16/764,836

(22) PCT Filed: Sep. 17, 2018

(86) PCT No.: PCT/CN2018/105948
§ 371 (c)(1),
(2) Date: May 15, 2020

(87) PCT Pub. No.: WO2019/095835
PCT Pub. Date: May 23, 2019

(65) Prior Publication Data
US 2020/0355386 A1    Nov. 12, 2020

(30) Foreign Application Priority Data

Nov. 16, 2017   (CN) .......................... 201711138903.6

(51) Int. Cl.
*F24F 11/46* (2018.01)
*F24F 11/88* (2018.01)
*G05B 15/02* (2006.01)

(52) U.S. Cl.
CPC .............. *F24F 11/46* (2018.01); *F24F 11/88* (2018.01); *G05B 15/02* (2013.01)

(58) Field of Classification Search
CPC .. F24F 11/46; F24F 11/88; F24F 11/30; F24F 11/63; G05B 15/02
See application file for complete search history.

(56) References Cited

U.S. PATENT DOCUMENTS 8,987,947 B2 *   3/2015   Higashiyama ............ F24F 1/20
                                                    307/113
9,671,123 B2 *   6/2017   Lee .......................... F24F 11/88
(Continued)

FOREIGN PATENT DOCUMENTS

CN     101089497     12/2007
CN     204392215 U    6/2015
(Continued)

*Primary Examiner* — Ramesh B Patel
(74) *Attorney, Agent, or Firm* — Jiwen Chen; Jacobson Holman PLLC

(57) ABSTRACT

A method and apparatus for identifying an air-conditioning circuit, and an air conditioner. The apparatus comprises an indoor unit circuit and an outdoor unit circuit, wherein the indoor unit circuit comprises an indoor unit communication module, an indoor unit communication module output signal acquisition module and an air-conditioning circuit identification module the outdoor unit circuit comprises an outdoor unit communication interface the indoor unit communication module is in communication connection with the outdoor unit communication interface the indoor unit communication module output signal acquisition module is connected to the indoor unit communication module and the air-conditioning circuit identification module is connected to the indoor unit communication module output signal acquisition module The method comprises: when an air-conditioning circuit is energized but is not started, acquiring an output signal of an indoor unit communication module and according to the output signal, identifying the air-conditioning circuit to be a low power-consumption standby circuit or a non-low power-consumption standby circuit After an air (Continued)

conditioner including the apparatus is energized, whether an air-conditioning circuit is a low power-consumption standby circuit is determined, thereby preventing an indoor unit circuit from incorrectly controlling the entering of an outdoor unit circuit into a low power-consumption mode or a non-low power-consumption mode, and avoiding unnecessary control mistakes and energy waste.

7 Claims, 3 Drawing Sheets

(56) References Cited

U.S. PATENT DOCUMENTS

| | | | | |
|---|---|---|---|---|
| 9,939,166 | B2 * | 4/2018 | Xi | H02J 9/04 |
| 10,132,520 | B2 * | 11/2018 | Yamane | F24F 11/30 |
| 10,969,134 | B2 * | 4/2021 | Zhang | F24F 11/65 |
| 2008/0092570 | A1 * | 4/2008 | Choi | F24F 11/30 |
| | | | | 62/157 |
| 2016/0363338 | A1 * | 12/2016 | Yamane | F24F 11/62 |

FOREIGN PATENT DOCUMENTS

| | | | | |
|---|---|---|---|---|
| EP | 1482253 | | 1/2010 | |
| EP | 2241831 | A1 * | 10/2010 | F24F 11/00 |
| EP | 3660406 | A1 * | 6/2020 | F24F 11/88 |

* cited by examiner

METHOD AND APPARATUS FOR IDENTIFYING AIR-CONDITIONING CIRCUIT, AND AIR CONDITIONER

This is a U.S. national stage application of PCT Application No. PCT/CN2018/105948 under 35 U.S.C. 371, filed Sep. 17, 2018 in Chinese, claiming priority of Chinese Application No. 201711138903.6, filed Nov. 16, 2017, all of which are hereby incorporated by reference.

FIELD OF TECHNOLOGY

The present invention belongs to the technical field of air conditioning, and in particular to a method and an apparatus whereby an identification of an air conditioner circuit is accomplished.

BACKGROUND

With an increasing demand on low energy consumption of air conditioning devices, those air conditioners featured by a low-power standby function have been widely used. However, those non-low-power standby air conditioners also have certain market share to satisfy customary requirements. Contrary to the non-low-power standby type, the low-power standby air conditioner indicates a configuration that an outdoor unit of an air conditioner will automatically work in a low-power standby mode as its corresponding indoor unit being switched off without being unplugged. Therefore, an indoor unit of an air conditioner is preferably designed as being capable of identifying whether or not an outdoor unit could work in a low-power standby mode via communication, so as to ensure the reliability and stability of low power standby control of air conditioner.

SUMMARY

An object of the present invention is to provide a method and an apparatus whereby an identification of an air conditioner circuit is accomplished, and also an air conditioner is disclosed for the same, with which an indoor unit is capable of determining whether or not an outdoor unit matched with could work in a low-power standby mode as being switched off without being unplugged, so as to reinforce the reliability and stability of control and reduce control failures.

In order to solve the above technical problems, the present invention is implemented by the following technical solutions.

One aspect is to provide a method whereby an identification of an air conditioner circuit is accomplished, wherein the air conditioner circuit comprises an indoor unit circuit having an indoor unit communication module and an outdoor unit circuit having an outdoor unit communication interface to which the indoor unit communication module is connected in communication. The method comprises: obtaining an output signal from the indoor unit communication module when the air conditioner circuit being connected to electricity supply without being switched on; and determining whether the air conditioner circuit is a low-power standby circuit or a non-low-power standby circuit according to the output signal.

Specifically, the step of determining whether the air conditioner circuit is a low-power standby circuit or a non-low-power standby circuit according to the output signal comprises: if the output signal contains a pulse signal, it is determined that the air conditioner circuit is a non-low-power standby circuit; otherwise, it is determined that the air conditioner circuit is a low-power standby circuit.

Further, the method comprises: if it is determined that the air conditioner circuit is a low-power standby circuit, the indoor unit circuit enables the outdoor unit circuit to be powered down when entering a standby mode; if it is determined that the air conditioner circuit is a non-low-power standby circuit, the indoor unit circuit enables the outdoor unit circuit to be powered on when entering a standby mode.

Another aspect of the present invention is to provide an apparatus for identifying an air conditioner circuit, wherein the air conditioner circuit comprises an indoor unit circuit having an indoor unit communication module and an outdoor unit circuit having an outdoor unit communication interface to which the indoor unit communication module connected in communication; in which the indoor unit circuit includes: an acquisition module configured to obtain an output signal from the indoor unit communication module when the air conditioner circuit being connected to electricity supply without being switched on; and an air conditioner circuit identification module configured to determine whether the air conditioner circuit is a low-power standby circuit or a non-low-power standby circuit according to the output signal, which is connected to the acquisition module.

Specifically, if the output signal received by the acquisition module, which is from the indoor unit communication module contains a pulse signal, it is determined that the air conditioner circuit is a non-low-power standby circuit; otherwise it is determined that the air conditioner circuit is a low-power standby circuit.

The third aspect of the present invention is to provide an air conditioner comprising the apparatus for identifying the air conditioner circuit.

Compared with the prior art, the advantages and positive effects of the present invention are: an outdoor unit could be firstly categorized as a low-power standby type or a non-low-power standby type when the air conditioner being connected to electricity supply; if it is determined as a low-power standby outdoor unit, then entering into a low-power standby mode; otherwise entering into a non-low-power standby mode, so as to avoid control failure and energy consumption to enable the operation of air conditioner to be more reliable and stable.

BRIEF DESCRIPTION OF THE DRAWINGS

Various aspects of this disclosure may be better understood upon reading the following detailed description and upon reference to the drawings in which:

In FIG. 1-3, 1—an indoor unit circuit; 2—an outdoor unit circuit; 3—an indoor unit communication module; 4—an outdoor unit communication interface; 5—an acquisition module for receiving an output signal from the indoor unit communication module; 6—an air conditioner circuit identification module; 7—an outdoor unit communication module; 8—an indoor unit controller; 9—an outdoor unit controller; 10—an outdoor-unit neutral wire; 11—a common terminal; 12—a first terminal; 13—a second terminal; L—power live wires; N—power neutral wires; K1—a first switch; K2—a second switch; K3—a third switch; D1—a first diode; R1—a current limiting resistor; PTC—a positive temperature coefficient thermistor.

DETAILED DESCRIPTION OF SPECIFIC EMBODIMENTS

One or more specific embodiments will be described below. In an effort to provide a concise description of these embodiments, not all features of an actual implementation are described in the specification.

Figure 1:
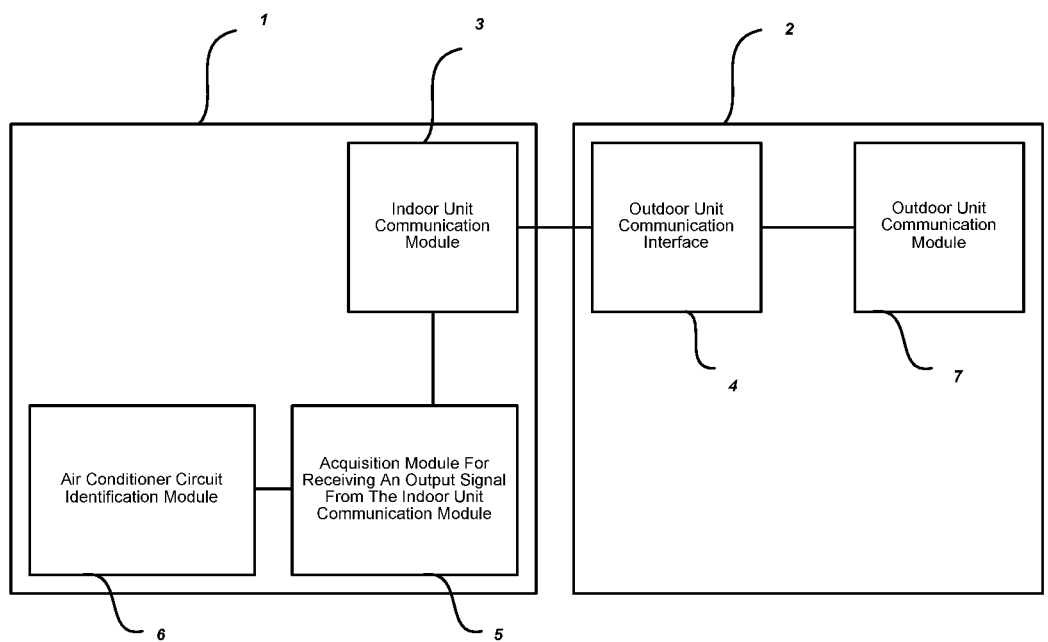
FIG. 1 is a schematic block diagram of an apparatus for identifying an air conditioner circuit in accordance with one aspect of the present invention.

A method whereby an identification of an air conditioner circuit is accomplished, which is disclosed by the present invention relies on an apparatus with a structure shown in FIG. 1. An air conditioner includes an indoor unit circuit 1 and an outdoor unit circuit 2, wherein the indoor unit circuit 1 includes an indoor unit communication module 3, an acquisition module 5 for receiving an output signal from the indoor unit communication module and an air conditioner circuit identification module 6; the outdoor unit circuit 2 includes an outdoor unit communication interface 4. The indoor unit communication module 3 is connected to the outdoor unit communication interface 4, the indoor unit communication module 3 is connected to the acquisition module 5, and the acquisition module 5 is connected to the air conditioner circuit identification module 6. The method includes: when the air conditioner circuit being connected to electricity supply but not being switched on, the indoor unit communication module 3 and the outdoor unit communication interface 4 are connected in communication, so that the indoor unit communication module 3 could obtain an output signal from the outdoor unit circuit 2 and also could send it out; with the connection to the indoor unit communication module 3, the acquisition module 5 could receive the output signal from the indoor unit communication module 3 and the air conditioner circuit identification module 6 could determine whether or not the air conditioner circuit is a low-power standby circuit.

In a preferable example, the method further includes: the acquisition module 5 receives the output signal from the indoor unit communication module 3. The air conditioner circuit identification module 6 identifies the output signal: if the output signal contains a pulse signal, it is determined that the air conditioner circuit is a non-low-power standby circuit; otherwise, it is determined that the air conditioner circuit is a low-power standby circuit.

Further, if it is determined that the air conditioner circuit is a non-low-power standby circuit, when the air conditioner circuit being connected to electricity supply without being switched on, the indoor unit circuit 1 and the outdoor unit circuit 2 are in electrical connection and the outdoor unit circuit 2 is being powered on; if it is determined that the air conditioner circuit is a low-power standby circuit, when the air conditioner circuit being connected to electricity supply without being switched on, the outdoor unit circuit 2 is being powered down.

An air conditioner disclosed by the present invention comprises the above-mentioned apparatus for identifying the air conditioner circuit; if the air conditioner circuit is being identified as a non-low-power standby circuit, when the air conditioner circuit being connected to electricity supply without being switched on, the indoor unit circuit 1 and the outdoor unit circuit 2 are in electrical connection and the outdoor unit circuit 2 is being powered on; if it is determined that the air conditioner circuit is a low-power standby circuit, when the air conditioner circuit being connected to electricity supply without being switched on, the outdoor unit circuit 2 is being powered down.

Figure 2:
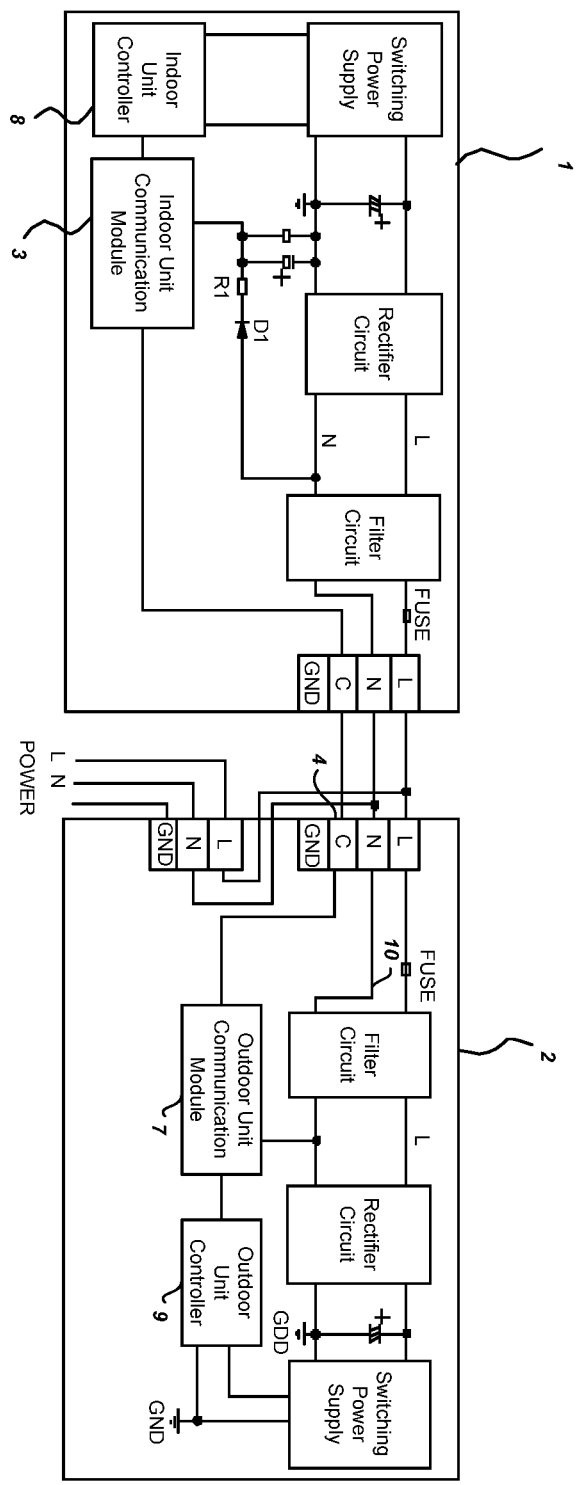
FIG. 2 is a schematic diagram of an apparatus for identifying an air conditioner circuit in accordance with a first embodiment of the present invention.
Figure 3:
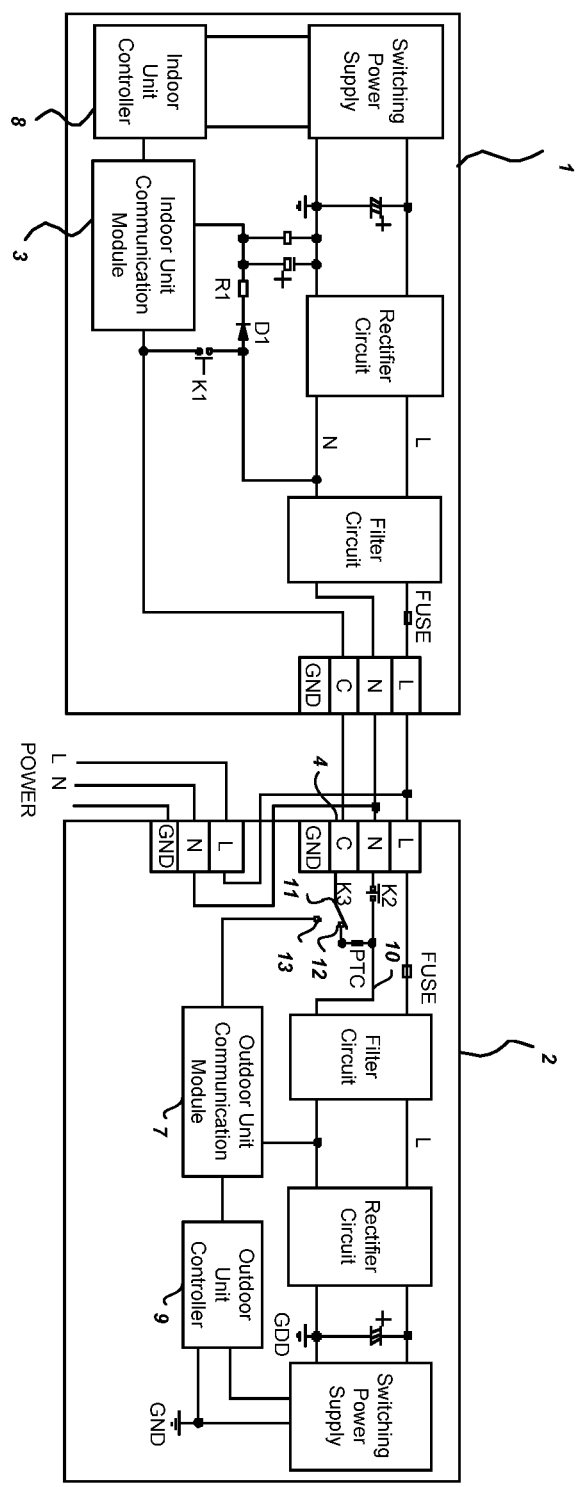
FIG. 3 is a schematic diagram of an apparatus for identifying an air conditioner circuit in accordance with a second embodiment of the present invention.

Exemplary detailed structures of an apparatus through which an identification of an air conditioner circuit is achieved will be further described with reference to FIG. 2 and FIG. 3.

Embodiment 1: FIG. 2 shows a non-low-power air conditioner circuit that an apparatus could identify. The air conditioner circuit comprises: an indoor unit circuit 1 and an outdoor unit circuit 2, power live wires L and power neutral wires N, wherein the power live wires L and the power neutral wires N are power lines for both of the indoor unit circuit 1 and the outdoor unit circuit 2. The indoor unit circuit 1 includes an indoor unit controller 8, an indoor unit communication module 3, a current limiting resistor R1 and a first diode D1. The outdoor unit circuit 2 includes an outdoor unit controller 9, an outdoor unit communication module 7, an outdoor unit communication interface 4 and an outdoor-unit neutral wire 10, and the indoor unit controller 8 is connected to the indoor unit communication module 3. When the indoor unit is connected to the outdoor unit, the indoor unit communication module 3 is connected to the outdoor unit communication interface 4. One end of the current limiting resistor R is connected to the indoor unit communication module 3 and the other end is connected to the cathode of the first diode D1, the anode of the first diode D1 is connected to a power neutral wire N of the indoor unit circuit 1. Within the outdoor unit, the outdoor unit communication module 7 is respectively connected to the outdoor unit controller 9, to the outdoor unit communication interface 4, and to the outdoor-unit neutral wire 10. When the air conditioner being plugged without receiving a switch-on command, the indoor unit communication module 3 is communicated with the outdoor unit communication module 7 through the outdoor unit communication interface 4, and therefore the indoor unit communication module 3 could receive an output signal from the outdoor unit communication module 7 and then send the output signal out to the indoor unit controller 8. In this way, the indoor unit controller 8 could on one hand work as the acquisition module 5 to obtain the output signal from the indoor unit communication module 3, and on the other hand work as the air conditioner circuit identification module 6 to determine which type of the output signal is. During this process the indoor unit communication module 3 is keeping in communication with the outdoor unit communication module 7, accordingly the indoor unit communication module 3 is capable of keeping receiving the output signal from the outdoor unit communication module 7. The output signal could be set as a pulse signal at the outdoor unit controller side. Hence, if the indoor unit controller 8 receives an output signal containing a pulse signal from the indoor unit communication module 3, it is determined that the air conditioner circuit is a non-low-power standby circuit, as the air conditioner circuit being connected to electricity supply without being switched on, the indoor unit and the outdoor unit are in electrical connection and the outdoor unit is being powered on.

Embodiment 2: FIG. 3 shows a low-power air conditioner circuit that an apparatus could identify. The air conditioner circuit comprises: an indoor unit circuit 1 and an outdoor unit circuit 2, power live wires L and power neutral wires N, wherein the power live wires L and the power neutral wires N are power lines for both of the indoor unit circuit 1 and the outdoor unit circuit 2. The indoor unit circuit 1 includes an indoor unit controller 8, an indoor unit communication module 3, a current limiting resistor R1, a first diode 1 and a first switch K1. The outdoor unit circuit 2 includes an outdoor unit controller 9 and an outdoor unit communication module 7, a second switch K2 and a third switch K3, a positive temperature coefficient thermistor PTC and an outdoor-unit neutral wire 10. The connection among those components: the indoor unit controller 8, the indoor unit communication module 3, the current limiting resistor R1, the first diode 1 and the outdoor-unit neutral wire 10 within the outdoor unit is same as those configuration disclosed in the Embodiment 1. The first switch K1 is a two-position switch having two connection terminals, one terminal is connected to the outdoor unit communication interface 4 and the other terminal is connected to the anode of the first diode D1; the outdoor unit controller 9 is connected to the outdoor unit communication module 7. Within the outdoor unit, the third switch K3 is a SPDT (Single Pole Double Throw) switch having a common terminal 11, a first terminal 12 and a second terminal 13, wherein the common terminal 11 is connected to the outdoor unit communication interface 4, the first terminal 12 is connected to the outdoor-unit neutral wire 10 and the second terminal 13 is connected to the outdoor unit communication module 7. The second switch K2 is a two-position switch which is connected between a power neutral wire N and the outdoor-unit neutral wire 10. The positive temperature coefficient thermistor PTC is connected between the neural wire 10 and the first terminal 12 of the third switch K3. The first switch K1 is controlled by the indoor controller 8 that is open when the air conditioner circuit being connected to power supply without being switched on, the second switch K2 is open and the common terminal 11 of the third switch K3 is connected to the first terminal 12 and disconnected with the second terminal 13 in a normal state. With this configuration, as the air conditioner circuit being connected to electricity supply without being switched on, due to the switch K2 is in an open state, the outdoor unit circuit 2 is being powered down so that the indoor unit communication module 3 fails to communicate with the outdoor unit communication module 7. Accordingly, working as the acquisition module 5, the indoor unit controller 8 could not receive an output signal, such as a pulse signal, from the outdoor unit, or namely from the outdoor unit communication module 7, and hence it is determined that the air conditioner circuit is a low-power-standby circuit by the indoor controller 8 working as the air conditioner circuit identification module 6. If the air conditioner is being operated to entering into a standby mode, as the indoor unit being switched off without being unplugged, the indoor unit controller 8 keeps the first switch K1 open, so that the outdoor unit circuit 2 is being powered down thereby the second switch K2 is keeping open and the outdoor unit circuit 2 remains in a switch-off state.

If the indoor unit circuit 1 receives a switch-on command, the indoor unit controller 8 enables the first switch K1 to close so that the outdoor unit circuit 2 is being powered on. When the outdoor unit circuit 2 is being powered on, the outdoor unit controller 9 outputs a signal to enable the second switch K2 to close. Then the indoor unit controller 8 controls the first switch K1 to back to an open state and the outdoor unit controller 9 controls the common terminal 11 of the third switch K3 is connected to the second terminal 13 and disconnected with the first terminal 12. The air conditioner could operate normally.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for identifying an air conditioner circuit, wherein the air conditioner circuit is either a low-power standby circuit or a non-low-power standby circuit, the air conditioner circuit comprising:

an indoor unit circuit including an indoor unit communication module, an acquisition module which is connected to the indoor unit communication module and configured to obtain an output signal from the indoor unit communication module when the air conditioner circuit being connected to electricity supply without being switched on, and an air conditioner circuit identification module which is connected to the acquisition module and configured to determine whether the air conditioner circuit is a low-power standby circuit or a non-low-power standby circuit according to the output signal;

an outdoor unit circuit having an outdoor unit communication interface which is connected to the indoor unit communication module in communication, an outdoor unit communication module and an outdoor-unit neutral wire; and power live wires and power neutral wires which are power lines for both of the indoor unit circuit and the outdoor unit circuit;

in the non-low-power standby circuit, the outdoor unit communication module is connected to the outdoor unit communication interface;

the low-power standby circuit including a first switch, a second switch and a third switch, wherein the first switch is a two-position switch having two connection terminals, one terminal is connected to the outdoor unit communication interface and the other terminal is connected to a power neutral line; the second switch is a two-position switch which is connected between a power neutral wire and the outdoor-unit neutral wire and is open in a normal state; the third switch is a SPDT switch having a common terminal, a first terminal and a second terminal, wherein the common terminal is connected to the outdoor unit communication interface, the first terminal is connected to the outdoor-unit neutral wire and the second terminal is connected to the outdoor unit communication module, the common terminal of the third switch is connected to the first terminal and disconnected with the second terminal in a normal state;

the method comprising:

the acquisition module obtaining the output signal from the indoor unit communication module when the air conditioner circuit being connected to electricity supply without being switched on; and the air conditioner circuit identification module determining whether the air conditioner circuit is a low-power standby circuit or a non-low-power standby circuit according to the output signal.

2. The method of claim 1, comprising:

if the output signal received by the acquisition module contains a pulse signal when the air conditioner circuit being connected to electricity supply without being switched on, it is determined that the air conditioner circuit is a non-low-power standby circuit by the air conditioner circuit identification module; otherwise, it is determined that the air conditioner circuit is a low-power standby circuit by the air conditioner circuit identification module.

3. The method of claim 1, comprising:
if it is determined that the air conditioner circuit is a low-power standby circuit, the indoor unit circuit enables the outdoor unit circuit to be powered down when entering a standby mode;
if it is determined that the air conditioner circuit is a non-low-power standby circuit, the indoor unit circuit enables the outdoor unit circuit to be powered on when entering a standby mode.

4. An apparatus for identifying an air conditioner circuit, wherein the air conditioner circuit is either a low-power standby circuit or a non-low-power standby circuit, the air conditioner comprising:
an indoor unit circuit including an indoor unit communication module;
an outdoor unit circuit having an outdoor unit communication interface to which the indoor unit communication module connected, an outdoor unit communication module and an outdoor-unit neutral wire; and
power live wires and power neutral wires which are power lines for both of the indoor unit circuit and the outdoor unit circuit;
in the non-low-power standby circuit, the outdoor unit communication module is connected to the outdoor unit communication interface;
the low-power standby circuit including a first switch, a second switch and a third switch, wherein the first switch is a two-position switch having two connection terminals, one terminal is connected to the outdoor unit communication interface and the other terminal is connected to a power neutral line; the second switch is a two-position switch which is connected between a power neutral wire and the outdoor-unit neutral wire, which is open in a normal state; the third switch is a SPDT switch having a common terminal, a first terminal and a second terminal, wherein the common terminal is connected to the outdoor unit communication interface, the first terminal is connected to the outdoor-unit neutral wire and the second terminal is connected to the outdoor unit communication module, the common terminal of the third switch is connected to the first terminal and disconnected with the second terminal in a normal state;
the apparatus includes:
an acquisition module connected to the indoor unit communication module, which is disposed in the indoor unit circuit and configured to obtain an output signal from the indoor unit communication module when the air conditioner circuit being connected to electricity supply without being switched on; and
an air conditioner circuit identification module connected to the acquisition module, which is disposed in the indoor unit circuit and configured to determine whether the air conditioner circuit is a low-power standby circuit or a non-low-power standby circuit according to the output signal.

5. An apparatus of claim 4, wherein if the output signal received by the acquisition module when the air conditioner circuit being connected to electricity supply without being switched on, which is from the indoor unit communication module contains a pulse signal, it is determined that the air conditioner circuit is a non-low-power standby circuit; otherwise it is determined that the air conditioner circuit is a low-power standby circuit.

6. An air conditioner comprising an apparatus for identifying an air conditioner circuit, wherein the air conditioner circuit is either a low-power standby circuit or a non-low-power standby circuit, the air conditioner comprising:
an indoor unit circuit including an indoor unit communication module;
an outdoor unit circuit having an outdoor unit communication interface to which the indoor unit communication module connected, an outdoor unit communication module and an outdoor-unit neutral wire; and
power live wires and power neutral wires which are power lines for both of the indoor unit circuit and the outdoor unit circuit;
in the non-low-power standby circuit, the outdoor unit communication module is connected to the outdoor unit communication interface;
the low-power standby circuit including a first switch, a second switch and a third switch, wherein the first switch is a two-position switch having two connection terminals, one terminal is connected to the outdoor unit communication interface and the other terminal is connected to a power neutral line; the second switch is a two-position switch which is connected between a power neutral wire and the outdoor-unit neutral wire, which is open in a normal state; the third switch is a SPDT switch having a common terminal, a first terminal and a second terminal, wherein the common terminal is connected to the outdoor unit communication interface, the first terminal is connected to the outdoor-unit neutral wire and the second terminal is connected to the outdoor unit communication module, the common terminal of the third switch is connected to the first terminal and disconnected with the second terminal in a normal state;
the apparatus includes:
an acquisition module connected to the indoor unit communication module, which is disposed in the indoor unit circuit and configured to obtain an output signal from the indoor unit communication module when the air conditioner circuit being connected to electricity supply without being switched on; and
an air conditioner circuit identification module connected to the acquisition module, which is disposed in the indoor unit circuit and configured to determine whether the air conditioner circuit is a low-power standby circuit or a non-low-power standby circuit according to the output signal.

7. The air conditioner of claim 6, wherein if the output signal received by the acquisition module when the air conditioner circuit being connected to electricity supply without being switched on, which is from the indoor unit communication module, contains a pulse signal, it is determined that the air conditioner circuit is a non-low-power standby circuit; otherwise it is determined that the air conditioner circuit is a low-power standby circuit.

* * * * *